United States Patent Office 2,751,383
Patented June 19, 1956

2,751,383

FLUORESCENT HETEROCYCLIC COMPOUNDS AND PROCESS FOR THEIR MANUFACTURE

Otto Trösken, Frankfurt am Main Fechenheim, Germany, assignor to Cassella Farbwerke Mainkur Aktiengesellschaft, Frankfurt am Main Fechenheim, Germany, a German company No Drawing. Application June 2, 1953,
Serial No. 359,231

Claims priority, application Germany May 2, 1951

1 Claim. (Cl. 260—240)

My U. S. application Serial No. 282,670, filed April 16, 1952, relates to new fluorescent heterocyclic compounds and a process for their manufacture.

My present invention is a continuation in part of the said application and relates to new valuable fluorescent heterocyclic compounds and a process for their manufacture, more particularly to those obtained by (a) treating aminoketones of the general formula $R.COCH_2NH_2$, wherein R means a radical of the benzene series, with acids or their functional derivatives of the general formula $X.CO—CH=CH—CO.X$, wherein X means a group that is exchangeable for the amino group, such as halogen, by (b) transforming the acylaminoketones, thus obtained, with condensing agents and, if desired, with agents capable of delivering sulfur or amino groups, into the corresponding bisazoles, and (c) if desired sulfonating the products.

The bisazoles thus obtained correspond to the general formula:

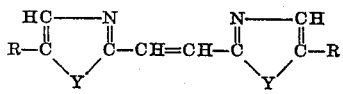

wherein R has the above significance and Y means —O—, —S— or —N<.

They are, like the products of the main patent, valuable intermediates for the chemical industry. They may, however, also be used as such owing to their blue fluorescence, especially for brightening up coloured or uncoloured substances, such as fibre materials, papers, soaps, detergents, ointments.

The following examples are given for the purpose of illustrating the invention, the parts being by weight and all temperatures in degrees centigrade.

Example 1

To a mixture of 172 parts of hydrochloric ω-aminoacetophenone and 100 parts of anhydrous sodium acetate in 1000 parts of glacial acetic acid, there are added by dropping in at 5–10° during 1 hour 80 parts of fumaric acid chloride. After adding another 100 parts of anhydrous sodium acetate the mixture is stirred for 1 hour at 15° and subsequently for 4–5 hours at 20–25°. Thereafter, the reaction mass is poured, with stirring, onto 2000 parts of ice, and the colorless substance which has separated is filtered by suction and washed with water. The fumaroyl-di-(ω-aminoacetophenone) shows, after recrystallizing from dimethylformamide, a melting point of 300°.

20 parts of fumaroyl-di-(ω-aminoacetophenone) are introduced at 10–15° by small portions into 200 parts of concentrated sulfuric acid. The clear solution is then stirred for 1 hour at 10–15° and thereafter, while stirring, cautiously given onto 1000 parts of ice, a yellow flocky substance being precipitated. After allowing the mass to stand for some time, there is filtered by suction, washed with water until neutral and dried. By dissolving in dimethylformamide and precipitating therefrom, the product is obtained in the form of yellow crystals which melt at 240°; they are 1.2-di-(5′-phenyl-oxazolyl-2′)-ethylene of the following formula:

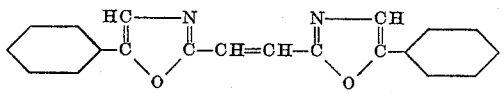

Its solutions in organic solvents show, even when most strongly diluted, an intense blue fluorescence.

Example 2

A solution of 10 parts of di-(fumaroyl)-ω-aminoacetophenone in 80 parts of sulfuric acid monohydrate is stirred for 1 hour at 40–45° and for 3 hours at 70–75°. After the solution has been allowed to cool, it is poured, while stirring, onto 250 parts of ice. The sulfuric acid being in excess is removed by means of chalk. After hot filtering by suction from the gypsum and after washing the residue with hot water, the filtrate is reacted with solution of sodium carbonate in order to obtain the sodium salt. By concentrating by evaporation, it is obtained as a weakly yellowish powder, of which the aqueous solutions show, even in very strong dilution, an intense blue fluorescence.

Cotton yarn is treated at a liquor ratio 1:40 at 40° during 20 minutes with a solution containing per litre 0.01 gram of the said sodium salt. The yarn thus treated shows a substantially more beautiful white shade than the untreated yarn.

I claim:

Process which comprises reacting aminoacetophenone of the formula

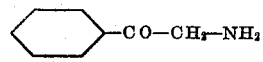

with fumaric acid chloride and reacting the di-(fumaroyl)-aminoacetophenone thus obtained with concentrated sulfuric acid at temperatures ranging between 40° C. and 75° C. to form the sulfonic acid of the formula

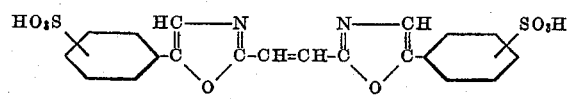

References Cited in the file of this patent

UNITED STATES PATENTS

| | | |
|---|---|---|
| 2,483,392 | Meyer | Oct. 4, 1949 |
| 2,488,094 | Ackerman | Nov. 15, 1949 |

OTHER REFERENCES

Wiley Chem. Reviews, vol. 37, No. 3, December 1945, pp. 403–6.